United States Patent [19]
Fukunaga et al.

[11] Patent Number: 6,049,570
[45] Date of Patent: Apr. 11, 2000

[54] PICTURE CODER

[75] Inventors: Shigeru Fukunaga; Toshihisa Nakai, both of Tokyo, Japan

[73] Assignee: Oki Electric Industry Co., Ltd., Tokyo, Japan

[21] Appl. No.: 08/987,774

[22] Filed: Dec. 9, 1997

[30] Foreign Application Priority Data

Dec. 27, 1996 [JP] Japan .................................. 8-350187

[51] Int. Cl.[7] ................................................. H04B 14/06
[52] U.S. Cl. .......................... 375/240; 348/409; 348/439; 348/415
[58] Field of Search ........................... 375/240; 348/409, 348/415, 439; H04N 7/36

[56] References Cited

U.S. PATENT DOCUMENTS

| | | | |
|---|---|---|---|
| 4,422,171 | 12/1983 | Wortley et al. | 714/748 |
| 4,774,587 | 9/1988 | Schmitt | 348/17 |
| 5,245,616 | 9/1993 | Olson | 714/748 |
| 5,410,723 | 4/1995 | Schmidt | 710/57 |
| 5,528,284 | 6/1996 | Iwami et al. | 348/13 |
| 5,572,654 | 11/1996 | Coelho | 348/439 |
| 5,861,894 | 1/1999 | Southeran | 345/202 |
| 5,898,461 | 4/1999 | Ohsawa | 348/439 |
| 5,914,755 | 6/1999 | Ito | 348/439 |

FOREIGN PATENT DOCUMENTS

| | | |
|---|---|---|
| 0 281 223 A2 | 9/1988 | European Pat. Off. . |
| 0 637 175 A3 | 2/1996 | European Pat. Off. . |
| 2278752 | 12/1994 | United Kingdom . |

OTHER PUBLICATIONS

Video Coding for Low Bitrate Communication, International Telecommunication Union, Dec. 5, 1995.

"Adaptive Error Control for Slowly Varying Channels", Michael Rice et al.; 8089 IEEE Transactions on Communications 42 (Feb. 1, 1994) No. 2/3/4 New York; pp. 917–926.

"A Simple Packet Retransmission Strategy for Throughput and Delay Enhancement on Power Line Communications Channels", Dr. John O. Onuga; 8047C 1EEE Transactions on Delivery 8 (Jul. 1, 1993) New York; pp. 818–826.

"A Robust Type II Hybrid ARQ Scheme With Code Combining for Mobile Communications", S. Bakhtiyari et al.; IEEE Proceedings of the Pacific Rim Conference (May 19, 1993); pp. 214–217.

*Primary Examiner*—Howard Britton
*Attorney, Agent, or Firm*—Rabin & Champagne, P.C.

[57] ABSTRACT

A picture coder decodes P frames without having to wait for the next I frame even if a data loss occurs, and ensures quick recovery from degraded picture quality. The picture coder, which controls updating of a reference picture based on a decoding status signal and a frame number sent from a picture decoder, uses an acknowledgment signal (ACK signal) as a decoding status signal. The picture coder has a decoding status determination module 109 which determines that a decoding error has occurred if the acknowledgment signal is not received within a specified time. The picture coder also has a reference frame updating module 110 for use when it is determined that a decoding error has occurred. The reference frame updating module 110 selects from pictures, which were received correctly before the decoding error occurred, one picture for use as the reference picture. This makes it possible for the picture coder to decode P frames without having to wait for the next I frame.

14 Claims, 8 Drawing Sheets

I FRAME    P FRAME

Fig. 4 PRIOR ART

DATA LOSS   CANNOT BE DECODED CORRECTLY

PICTURE CODER

BACKGROUND OF THE INVENTION

1. Field of the Invention

The present invention relates to a picture coder, and more particularly to an improvement in picture quality degraded by a data error or a data loss caused during picture data transmission.

2. Description of the Prior Art

Figure 3:
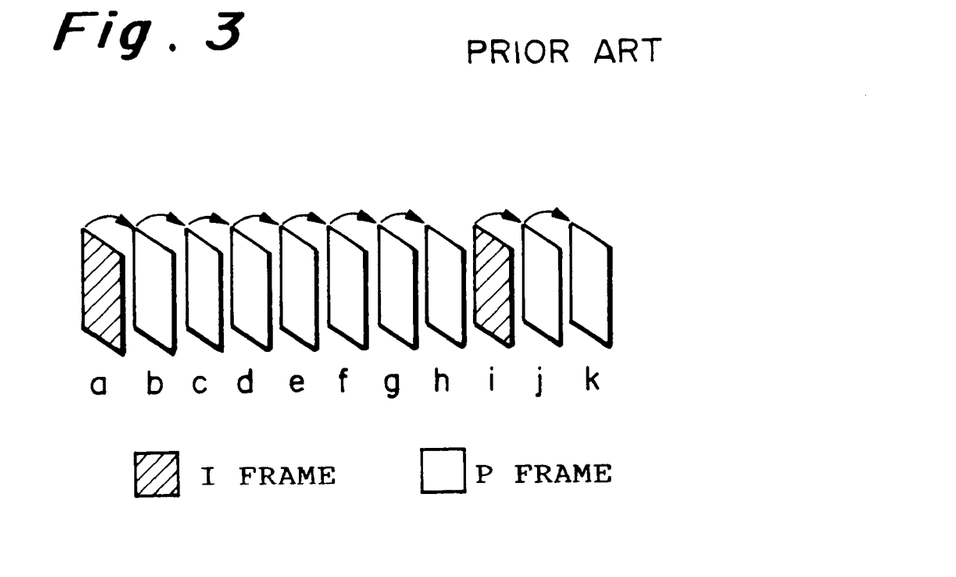
FIG. 3 is a conceptual diagram showing conventional coding.

Recently, standardization of picture coding methods has been under way, with the implementation of moving-picture transmission systems in mind. Those systems include a videotelephone, videoconferencing, and video-on-demand (VOD). ITU-T Recommendation H.263 and MPEG (Moving Picture Experts Group) are well known as international standardization standards. For example, the coding method adopted by the ITU-T Recommendation H.263, shown in FIG. 3, performs intra-frame coding on time-sequenced frames (I frames a and i) at regular intervals and, at other times, performs inter-frame coding for each of P frames (inter-frame coded frames, b - h, j - ) with reference to the immediately preceding frame to remove temporal redundancy. In the following discussion, a frame coded in the intra-frame coding method is referred to as an I frame, while a frame coded in the inter-frame coding method is referred to as a P frame.

This technology is described in "Standardization of Multimedia Coding" by Hiroshi Yasuda, pp. 84–97, Maruzen, 1991).

The method proposed by Recommendation H.263, which performs the inter-frame coding of each frame by referencing the immediately preceding frame, requires that all the frames be transmitted in the correct sequence. For a telephone line or an ISDN line over which data is transmitted after a connection with a partner is established, data reaches the partner without loss and in the correct sequence.

However, for an Ethernet LAN or an ATM network in which data is divided into small units (called packets or cells) before it is transmitted, there is a possibility that packets are lost or transmitted in an incorrect sequence.

In general, networks employ a protocol (for example, TCP: Transmission Control Protocol) in which the transmitting device sends packets with attached serial numbers, and the receiving device rearranges the packets in the correct sequence, confirms their arrival, and sends requests for the retransmission of non-arriving packets back to the transmitting device in order to deal with these problems and increase network reliability.

However, when network operation is unstable and packets are dropped frequently, retransmission under this type of protocol can cause large cumulative delays to build up, which is inappropriate for the real-time transmission of moving pictures. In some cases, it is preferable to display new data, even if that means skipping a frame, rather than retransmitting old data, especially when new data can be displayed immediately.

Broadcasting and multicasting are schemes which send data to a plurality of sites at a time. However, when packet dropout occurs during transmission of a packet to one of the sites, the above protocol requires that the same packet be sent even to those sites which have received the packet successfully, significantly increasing the network load.

Broadcasting and multicasting are therefore performed using a protocol that does not re-transmit a packet, such as the User Datagram Protocol (UDP); as a result, the probability of packet dropout increases.

In wireless networks, the data error rate or data drop-out rate is high not only when data is sent in packets but when a line connection is established before data is sent. In addition, when the errors exceed the error-correcting capability of the receiving device, a sequence of data items are sometimes discarded to receive some other part of data successfully. Data dropouts in wireless networks therefore tend to be larger than in wireline networks.

Another problem is that the processing speed of the sending device is not always equal to that of the receiving device. For example, decoding all the frames on a slower receiving device would put much frame data in the wait state, causing long delays. This requires the receiving device to intentionally skip frames. However, when there is no decoding data for a frame preceding the current frame, as in the inter-frame coding method according to the prior art, the current frame cannot be decoded and therefore frames cannot be skipped as intended.

Figure 4:
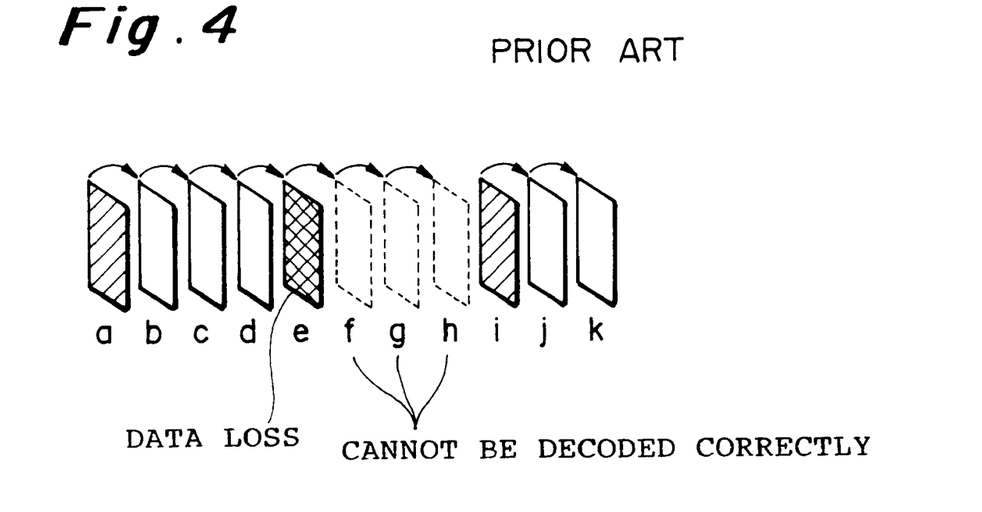
FIG. 4 is a conceptual diagram showing an example of coding when a transmission error occurs in a conventional system.

FIG. 4 shows an example of frame dropout that may occur during transmission of frames. When frame e is dropped out or cannot be decoded because of slow processing, the P frames (f, g, h) cannot be decoded until the next I frame, i, is received.

Thus, in order to send all the frames successfully in a network in which frame dropout or frame skipping occurs frequently, intra-frame coding for all the frames is more efficient. However, the problems with this method, which does not use inter-frame coding, are that there is temporal redundancy and that data transmission efficiency is degraded.

In addition, in a system where a coder performs processing in response to status information sent from a receiving device and, upon detecting a transmission error or a decoding error, a negative acknowledgment signal (NACK: Negative Acknowledgment Signal) is sent, there are following problems. For example, when data identification information contained in coded data, such as a data number, is incorrect, information on an incorrect data number may not be sent back to the coder. In this case, the coder either ignores the negative acknowledgment signal or performs processing on unintended data with an incorrect data number. This may lead to an unexpected operation.

To solve the problem of negative acknowledgment signals, it is possible to estimate the correct numbers from correct data received after the error and to send the acknowledgment signals at a time. However, this method prevents acknowledgment signals from being sent until the end of incorrect data numbers is detected, causing a delay and preventing quick recovery from degraded picture quality.

Thus, to successfully transmit moving-picture data over a network in which a data dropout occurs frequently, there has been a long felt need for a picture coding system which ensures high coding efficiency and quick recovery from degraded picture quality.

SUMMARY OF THE INVENTION

To solve the above problems, a picture coder according to the present invention includes coding means for coding input pictures through predictive coding, one at a time, based on a reference picture and for outputting coded data, transmission means for transmitting the coded data coded by the coding means and a frame number thereof to a picture decoder, and reference picture updating means for controlling updating of the reference picture based on a decoding status signal sent from the picture decoder and an associated frame number. The picture coder comprises:

That is, the picture coder comprises means which uses an acknowledgment signal (ACK: Acknowledgment signal) as the decoding status signal and which returns the acknowledgment signal when there is no transmission or decoding error. The means determines that a decoding error has occurred if the acknowledge signal is not received within a specified time. And, as a next reference picture, the reference picture updating means selects one of pictures transmitted correctly before the decoding error occurred.

The picture coder according to the present invention uses a decoder which comprises reception means for receiving coded data coded thorough predictive coding and a frame number (or frame number and block number) of a reference picture of the coded data over a transmission line, decoding means for decoding coded data, received by the reception means, with the use of a frame number (or frame number and block number) of the reference picture, and decoding status signal transmission means for outputting to the picture coder a decoding status signal representing a status of decoded data decoded by the decoding means and a frame number (or frame number and block number) corresponding to the data.

Thus, the picture decoder sends decoding status information on received coded data to the picture coder and, during coding, uses one of correctly-decoded frames (or blocks) as the reference picture. Therefore, the picture decoder can decode a P frame without having to wait for the next I frame.

In addition, the acknowledgment signal is used as the decoding status signal. This enables a correct frame number (or frame number and block number) to be returned to the coder, allowing the coder to perform processing correctly. At the same time, elimination of the need to wait for data after an error minimizes a delay.

BRIEF DESCRIPTION OF THE DRAWINGS

The present invention will be understood more fully from the detailed description and the accompanying drawings below of the preferred embodiments of the invention.

In the drawings.

DESCRIPTION OF THE PREFERRED EMBODIMENTS

(A) First Embodiment

Referring to the attached drawings, there is shown a configuration, operation, and effect of a moving-picture coder (sending device) used in the first embodiment.

The moving-picture coder according to the present invention updates a reference picture on a frame basis or on a block basis, where a block is one partition of a frame. When picture data is processed on a frame basis, a decoding status signal is returned and the reference picture is updated each time a frame is updated; when picture data is processed on a block basis, the decoding status signal is returned and the reference picture is updated each time a block is updated. The processing and configuration described below apply to frames and blocks, although only frames are mentioned in some part of the description The picture coder (sending device) in the first embodiment is characterized in that new means is provided to check the status of the acknowledgment (ACK) signal. That is, the means determines that no error has occurred on a frame or a block for which the acknowledgment signal is received and that a decoding error has occurred on a frame or a block for which the acknowledgment signal is not received. The picture coder updates reference frames according to the ACK signal only.

Figure 1:
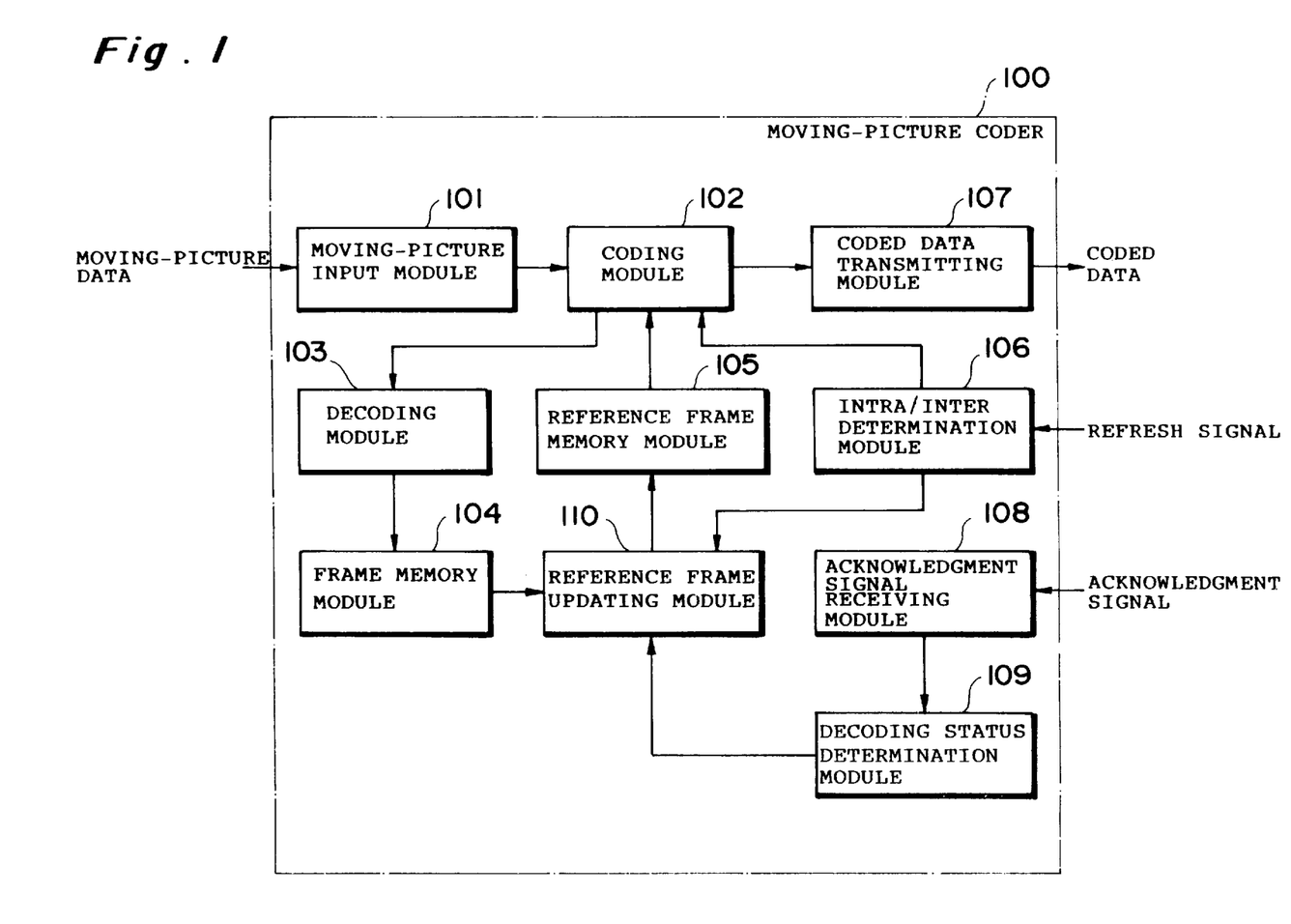
FIG. 1 is a block diagram showing an example of a functional configuration of a picture coder (sending device) used in a first embodiment.

A functional configuration of the moving-picture coder (sending device) used in the first embodiment is shown in FIG. 1.

As shown in FIG. 1, a moving-picture coder 100 comprises a moving-picture input module 101, a coding module 102, a decoding module 103, a frame memory module 104, a reference frame memory module 105, a intra/inter determination module 106, a coded data transmitting module 107, an acknowledgment signal receiving module 108, a decoding status determination module 109, and a reference frame updating module 110.

The moving-picture input module 101 passes moving-picture data from an input source, such as a video camera, to the coding module 102, one frame at a time.

The coding module 102 codes entered frame data, one frame at a time or one block at a time, and passes coded data to the decoding module 103 and the coded data transmitting module 107. When coding data, the coding module 102 switches processing between intra-frame coding and inter-frame coding according to an instruction from the intra/inter determination module 106, where "intra" refers to intra-frame coding and "inter" refers to inter-frame coding. When the coding module 102 performs inter-frame coding, it references frame data stored in the reference frame memory module 105.

The decoding module 103 decodes coded data and writes decoded data, as well as frame numbers, into the frame memory module 104.

The frame memory module 104 is a memory medium, such as a memory circuit, which memorizes data for each frame. Each time a reference frame is updated by the reference frame updating module 110, unnecessary data is cleared from the frame memory module 104.

The reference frame memory module 105, a memory medium such as a memory circuit which contains reference frame data for use in inter-frame coding, is updated by the reference frame updating module 110.

The intra/inter determination module 106 selects which coding to use: intra-frame coding or inter-frame coding.

Normally, intra-frame coding is selected at regular intervals (e.g., once every thirty frames) and, at other times, inter-frame coding is selected; when the intra/inter determination module 106 receives a refresh signal from a receiving device (moving-picture decoder not shown in the drawing), it forces intra-frame coding and passes information to that effect to the coding module 102 and the reference frame updating module 110

The coded data transmitting module 107 sends coded moving-picture data to one or more receiving devices (moving-picture decoders). The coded data transmitting module 107 multiplexes control information, such as an intra/inter flag or a reference frame number onto the data; it also multiplexes sending device information and receiving device information, as necessary, onto the data.

The acknowledgment signal receiving module 108 receives the acknowledgment signal (decoding status signal), which indicates that which frames (or blocks) have been decoded, from the receiving device (moving-picture decoder), and passes the received decoding status signal to the reference frame updating module 110.

The decoding status determination module 109 determines that a frame (or a block) for which the acknowledgment signal (ACK signal) is received within a specified time has no decoding error and that a frame (or a block) for which the acknowledgment signal is not received within a specified time has a decoding error. It then passes the acknowledgment status and the frame number (or frame number and block number) to the reference frame updating module 110.

The reference frame updating module 110 updates the reference frame, responsive to the instructions received from the intra/inter determination module 106 and the decoding status determination module 109. The reference frame updating module 110 usually updates the reference frame each time it receives a frame; when a decoding error occurred, the module returns the reference frame to a most recent frame (or block) for which acknowledgment signal was received. Upon receiving an intra-frame coding instruction from the intra/inter determination module 106, the reference frame updating module 110 copies the data of the current frame from the frame memory module 104 to the reference frame memory module 105 and deletes all the frame data from the frame memory module 104.

Figure 2:
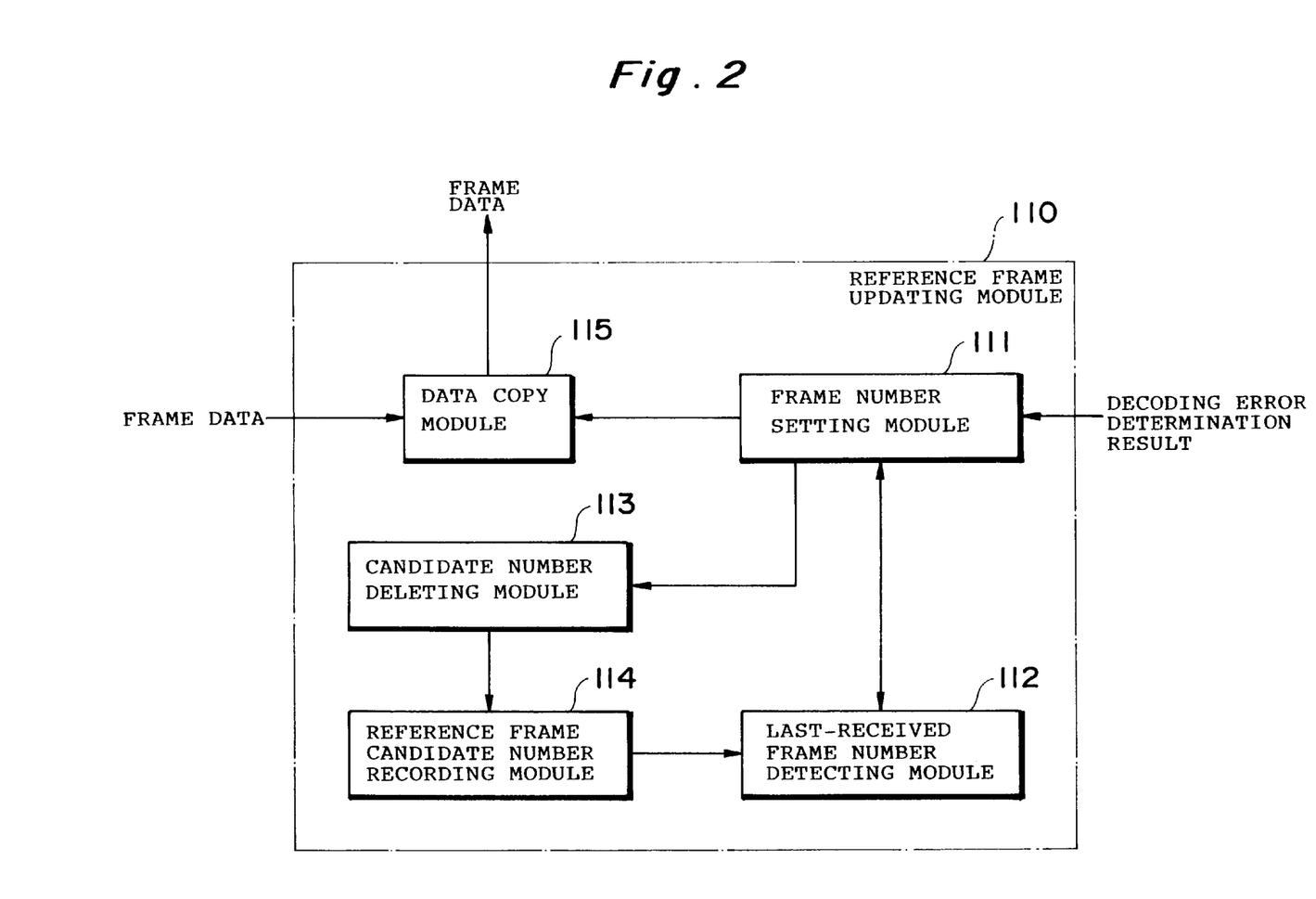
FIG. 2 is a block diagram showing an example of detailed functional configuration of a reference frame updating module used in the first embodiment.

The reference frame updating module 110 is further divided into detailed functional blocks. FIG. 2 is a detailed functional configuration diagram of the reference frame updating module 110. As shown in FIG. 2, the reference frame updating module 110 comprises a frame number setting module 111, a last-received-frame number detecting module 112, a candidate number deleting module 113, a reference frame candidate number recording module 114, and a data copy module 115.

When the frame number setting module 111 receives information indicating that a decoding error has occurred from the decoding status determination module 109, it passes the incorrect-frame number (or frame number and block number) to the last-received-frame number detecting module 112 and the candidate number deleting module 113. Upon receiving a last-received-frame number from the last-received-frame number detecting module 112, the frame number setting module 111 sets up the last-received-frame number as the number of frame (or the number of frame and the number of block) to be copied, and passes the number to the data copy module 115.

When the frame number setting module 111 receives information indicating that "there is no candidate number," it determines that no error occurred and suspends processing.

When the frame number setting module 111 receives information indicating that no decoding error has occurred from the decoding status determination module 109, it passes the correct-frame number (or frame number and block number) to the candidate number deleting module 113.

The last-received-frame number detecting module 112 searches a candidate number list stored in the reference frame candidate number recording module 114 to check to see if an incorrect-frame number received from the frame number setting module 111 is recorded in the list.

When the incorrect-frame number received from the frame number setting module 111 is recorded in the candidate frame number list, the last-received-frame number detecting module 112 finds a last-received-frame number and returns it to the frame number setting module 111. On the other hand, when the incorrect-frame number received from the frame number setting module 111 is not recorded in the candidate frame number list, the last-received-frame number detecting module 112 returns information indicating that "there is no candidate number" to the frame number setting module 111.

When the candidate number deleting module 113 receives an incorrect-frame number (or frame number and block number) from the frame number setting module 111, it deletes the incorrect-frame number (or frame number and block number) and the frame numbers added later than the frame number from the candidate frame number list stored in the reference frame candidate number recording module 114. This keeps only correct-frame numbers in the reference frame candidate number recording module 114. At this time, it is also possible to delete frame data corresponding to the frame number from the frame memory module 104.

When the candidate number deleting module 113 receives a correct-frame number (or frame number and block number) from the frame number setting module 111, it records the number in the reference frame candidate number recording module 114 as a last-received-frame number. It also deletes the number (or frame number and block number) and the frame numbers earlier than the frame number from the candidate frame number list recorded in the reference frame candidate number recording module 114. At this time, it is also possible to delete frame data corresponding to the deleted frame number from the frame memory module 104.

The reference frame candidate number recording module 114 manages the numbers of frame data stored in the frame memory module 104. It records a last-received-frame number, which is the number of a frame to be used as a reference frame, and a list of candidate frame numbers. A list may be creates for each block. Thus, each time latest frame data coded by the coding module 102 is recorded in the frame memory module 104, the reference frame candidate number recording module 114 adds the frame number to the candidate list. The candidate frame number list, which is in the reference frame candidate number recording module 114 in the above description, may be recorded in the frame memory module 104 as header information.

The data copy module 115 usually copies latest frame data from the frame memory module 104 to the reference frame memory module 105. Upon receiving a last-received-frame number from the frame number setting module 111, the data copy module 115 copies the corresponding frame data from the frame memory module 104 to the reference frame memory module 105.

Next, the operation of the picture coder (sending device) used in the first embodiment is described.

The moving-picture coder checks the decoding status signal, which is returned from a moving-picture decoder, to switch a reference picture used in inter-frame predictive coding. The moving-picture coder uses the acknowledgment signal (ACK signal) as the decoding status signal. When a decoding error occurs, this signal is not returned.

The moving-picture coder updates the reference picture each time it receives a frame while no decoding error occurs. This is the same coding method as that proposed by H.263 in which the immediately-preceding frame is always referenced during coding. When a decoding error is detected, the last frame received correctly is used as the reference picture.

Figure 5:
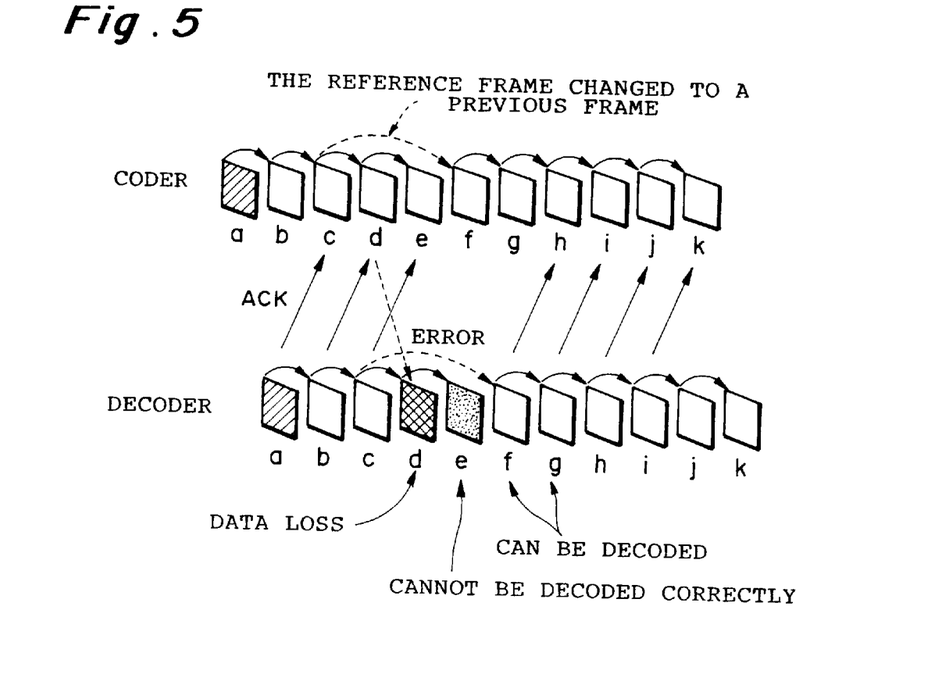
FIG. 5 is a conceptual diagram showing an example of coding in the first embodiment.

FIG. 5 shows an example of operation that is performed by the moving-picture coder which has the reference frame updating module built-in. For simplicity, each frame is composed of one block. For a multiple-block frame, the coder does the same operation for each block.

While no decoding error occurs, the moving-picture coder updates the reference frame each time it receives a frame. When the ACK signal arrives, the coder records the number of the frame (or block) as the last-received-frame number. For example, when frame e is coded, the last-received-frame number is frame c. When a transmission error occurs on frame d, the moving-picture decoder cannot decode frame d and therefore does not return the ACK signal for frame d. When the ACK signal is not received, the moving-picture coder detects that a decoding error has occurred on frame d and changes the reference frame to the frame corresponding to last-received-frame number (frame c) and codes frame f.

By doing so, the moving-picture decoder can decode the next frame f and the following frames, although frame e cannot be decoded because it is already coded and transmitted before the decoding error is detected. This allows the system to quickly recover from a decoding error caused by a transmission error.

When a decoding error is detected on frame d, the moving-picture coder deletes the numbers of frame d and all the later frames (only frame e in the example in the figure) from the reference frame candidate number list. This prevents frame d which is incorrect and frame e which references frame d and therefore causes a decoding error from being selected as a reference picture. In addition, as explained below, decoding error processing for frame e may be omitted. At this time, it is possible to delete frame data corresponding to the deleted numbers from the frame memory module 104. This enables a small-memory system to delete data which becomes unnecessary, eliminating the possibility of clearing necessary data due to a shortage of memory and thereby ensuring coding efficiency.

The ACK signal is not returned for frame e because it cannot be decoded by the moving-picture decoder. Therefore, the moving-picture coder detects a decoding error on frame e. If, at this time, the reference frame is changed to a previous frame (c) for frame e, frame g also references frame c, with degraded coding efficiency. However, because frame e is already deleted from the reference frame candidate list, information indicating "there is no candidate number" is returned. Therefore, the reference frame is not returned to a frame with the last-received-frame number, with no degradation in coding efficiency.

Figure 6:
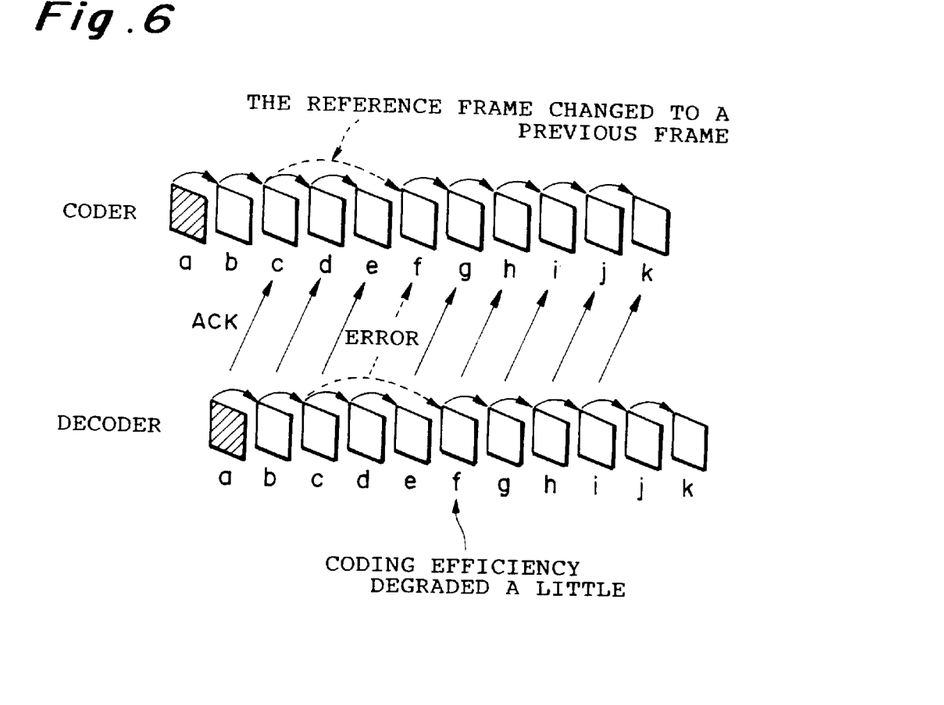
FIG. 6 is a conceptual diagram showing an example of coding when an ACK signal transmission error occurs in the first embodiment.

FIG. 6 shows an example of coding when an ACK signal error occurs. When an ACK transmission error occurs on frame d, the moving-picture coder detects that a decoding error has occurred on frame d, changes the reference frame to a frame (c) with the last-received-frame number, and then codes frame f. Although the moving-picture decoder has received frame d correctly, the reference frame is changed to a previous frame and therefore the coding efficiency of frame f is degraded to some degree. However, it should be noted that all the frame are decoded and little or no effect is found on other frames. In a system where the negative acknowledgment signal (NACK signal) is used as the decoding status signal, a NACK signal error generates a frame that cannot be decoded, causing somewhat serious effects. On the other hand, in a system where the absence of the ACK signal indicates a decoding error, an ACK signal transmission error would minimize coding efficiency degradation to such a level that almost every person cannot notice.

As described above, when no transmission error occurs in a system of the first embodiment, the reference frame is updated each time a frame is received. Thus, the coding efficiency is the same as that of other coding methods such as that proposed by ITU-T Recommendation H.263.

When a transmission error occurs, decoding correctness of a frame already coded cannot be guaranteed but the subsequent frames can be decoded before the next I frame arrives and therefore coding efficiency is not degraded.

In addition, use of the acknowledgment signal (ACK signal) as the decoding status error makes it possible to transmit frame numbers and block numbers correctly and to eliminate the need to wait for correct data after an error, thus minimizing the delay. Even if an ACK signal transmission error occurs, coding efficiency is somewhat degraded but all the frames are decoded.

Another advantage is that, when continuous decoding errors are detected, the reference frame candidate list used in this embodiment bypasses the processing of changing the reference frame to a previous frame when the second error occurs, ensuing coding efficiency.

Variations of the first embodiment are:

(1) In the above embodiment, the reference frame updating module 110 copies frame data from the frame memory module 104 to the reference frame memory module 105 when intra-frame coding is performed. This need not always be done. For example, the intra/inter determination module 106 may send an intra-frame coding request signal to the decoding module 103 and, at the same time, the decoding module 103 may write frame data directly into the reference frame memory module 105 during intra-frame coding. This enables copy processing to be bypassed and makes the configuration simple.

(2) In FIG. 1, the reference frame memory module 105 and the frame memory module 104 are separate modules. This configuration is not always required. Frame data may be stored in a memory module, with the reference frame being pointed to by a pointer. This configuration eliminates the need for copying data from the frame memory module 104 to the reference frame memory module 105 during intra-frame coding; simply moving the pointer points to the reference frame, thereby making the circuit configuration simple.

(B) Second Embodiment

Referring to the attached drawings, there is shown a configuration and operation of a moving-picture coder (sending device) used in the second embodiment.

The following describes a reference frame update method which uses an acknowledgment signal (ACK signal) but which is different from a method used in the first embodiment. A moving-picture coder used in the second embodiment uses only the ACK signal and switches the reference frame update method between the method different from the first embodiment and the method used in the first embodiment according to the status of a transmission line.

Figure 10:
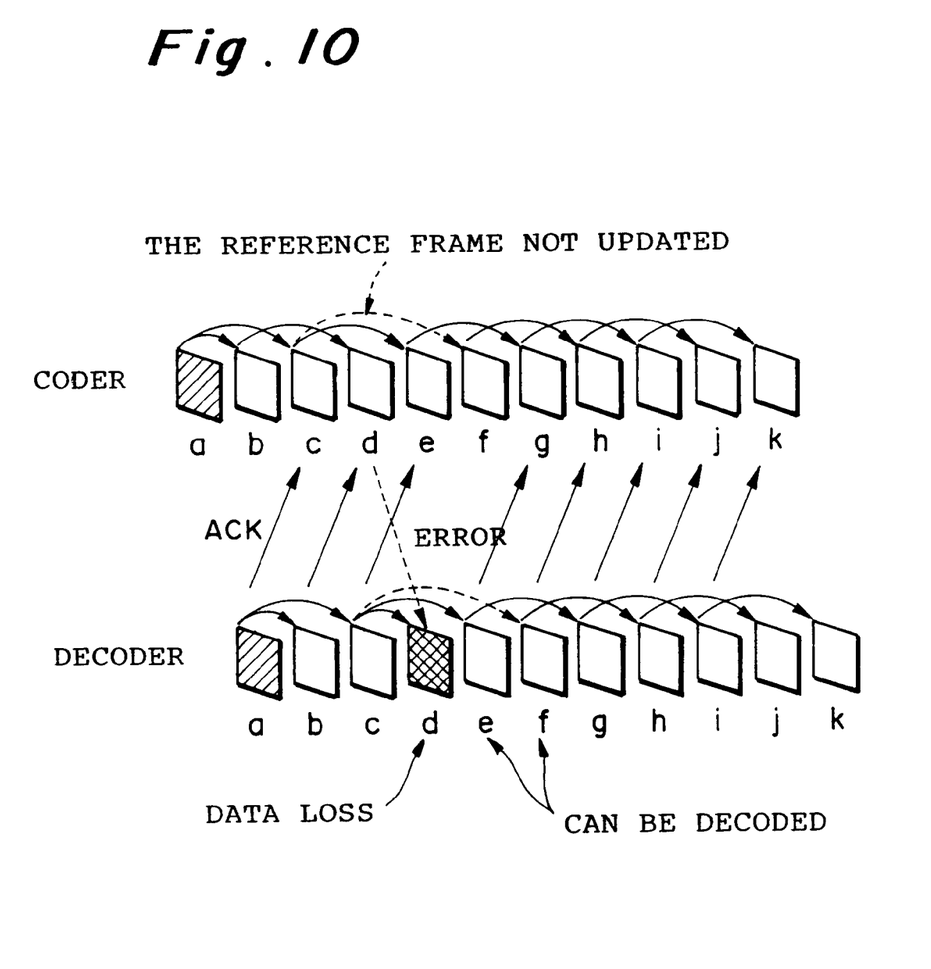
FIG. 10 is a conceptual diagram showing an example of coding when a transmission error occurs in an active mode.

FIG. 10 shows an example of operation of the update method different from that used in the first embodiment. This method is characterized in that a reference picture is updated only when the ACK signal is received but not when the ACK signal is not received.

For example, for each of frames (a, b, c), the ACK signal is sent from the receiving device to indicate that it has been received correctly. Each time the ACK signal is received, the reference frame is switched and the next frame is coded.

When a error occurs during transmission of frame d, the ACK signal is not sent and therefore frame d is not used as a reference frame. Instead, frame c, which was already received correctly, is used as a reference frame and the next frame f is coded.

This update method always performs coding with a correctly-received reference frame as the reference frame. Therefore, the receiving device can decode a P frame without having to wait for an I frame that will be sent later, with little or no degradation in coding efficiency even when a frame is lost. However, if the round trip delay in the period of time from when the sending device sends coded data to the time the ACK signal is received is large, the ACK signal for the previous frame is not received before the coding of the next frame is started. This means that, even when there is no transmission error, a frame that is two or more frames before the current frame is referenced and so the coding efficiency is more or less degraded.

The update method shown in FIG. 10 updates the reference frame when no transmission error occurs, while the update method shown in the first embodiment updates the reference frame when a transmission error occurs. In the following description, the former (the update method shown in FIG. 10) is referred to as an Active mode, while the latter (the update method shown in the first embodiment) as a Negative mode. The Active mode is effective when the transmission status is good; the Negative mode is effective when the transmission status is bad. Thus, switching these two modes according to the transmission status ensures high coding efficiency.

Figure 7:
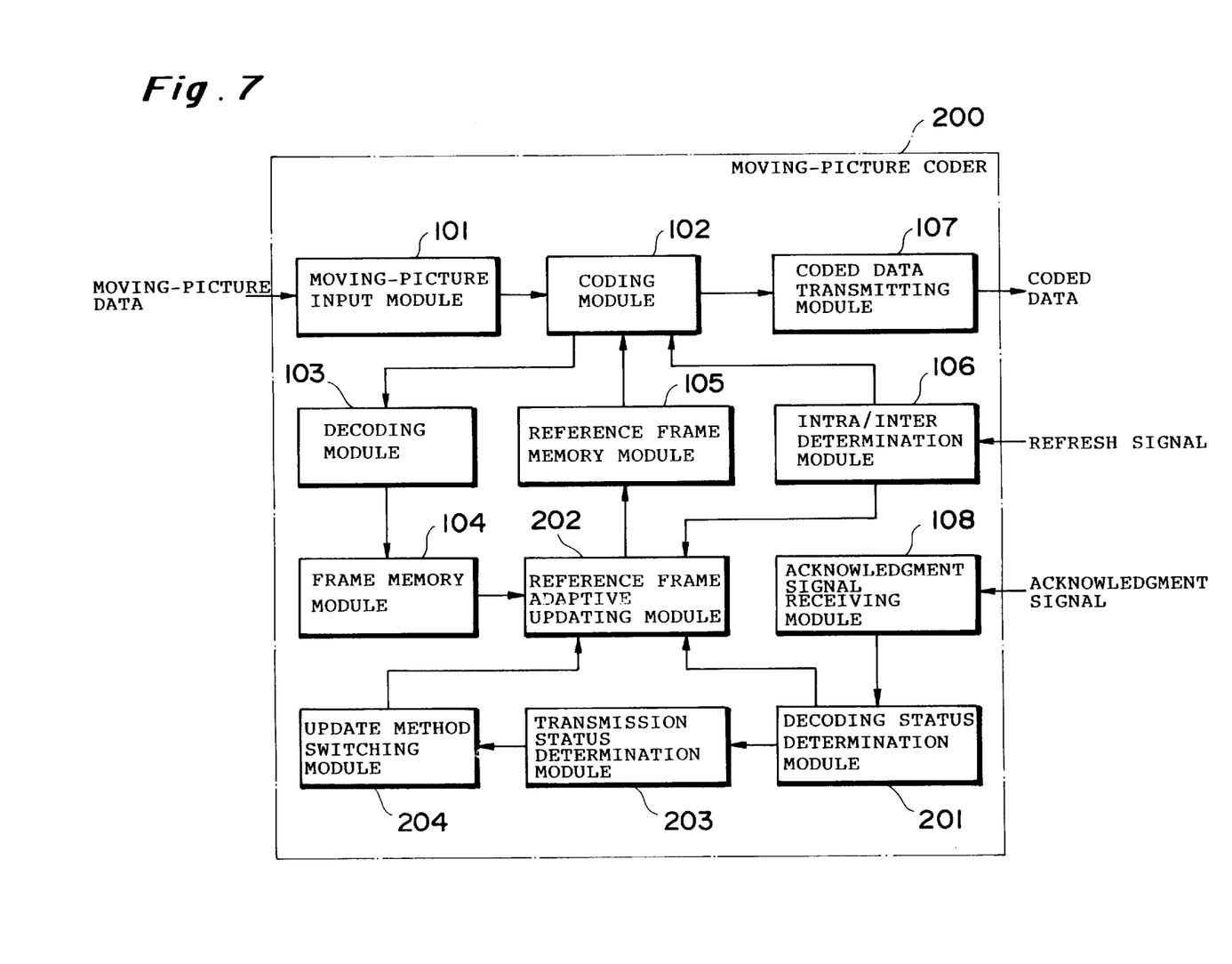
FIG. 7 is a block diagram showing an example of functional configuration of a picture coder (sending device) used in a second embodiment.

The moving-picture coder (sending device) used in the second embodiment comprises a transmission status determination module 203 which determines the status of the transmission line with the use of the decoding status signal, an update method switching module 204 which switches the update mode between the Active mode and the Negative mode according to the transmission line status, and a reference frame adaptive updating module 202 which updates the reference frame adaptively.

When the transmission line status is good, the Negative mode is enabled to update the reference frame each time a frame is received; in this case, only when a transmission error occurs, the reference frame is returned to the last reference frame that was positively acknowledged. On the other hand, when the transmission line status is bad, the Active mode is enabled; in this case, when a frame is acknowledged, the reference frame is updated.

FIG. 7 is a functional configuration diagram of a moving-picture coder (sending device) in the second embodiment. Note that, for a module in FIG. 7 with a function equivalent to that of a module shown in FIG. 1, the corresponding number is used and no description is given here. The following describes only new modules: decoding status determination module 201, reference frame adaptive updating module 202, transmission status determination module 203, and update method switching module 204.

The decoding status determination module 201, like the decoding status determination module 109, determines that a frame (or a block) for which the acknowledgment signal (ACK signal) is received within a specified time has no decoding error and that a frame (or a block) for which the acknowledgment signal is not received within a specified time has a decoding error, based on the decoding status signal from the acknowledgment signal receiving module 108. It then passes the acknowledgment status and the frame number (or block number) to the reference frame updating module 110 and the transmission status determination module 203.

The reference frame adaptive updating module 202 updates the reference frame according to instructions from the intra/inter determination module 106, decoding status determination module 201, and update method switching module 204.

There are two reference frame update methods: Active mode and Negative mode. In the Active mode, a frame (or block) on which no decoding error occurred is used as the reference frame picture; in the Negative mode, the reference frame picture is updated each time a frame (or block) is received and, when a decoding error occurs, the reference frame is returned to the last frame on which no decoding error occurred.

The reference frame adaptive updating module 202 switches the mode between the Active mode and the Negative mode according to an instruction from the update method switching module 204.

For example, upon receiving information indicating "there is no decoding error" from the decoding status determination module 201 in the Active mode, the reference frame adaptive updating module 202 copies frame data (or block data) from the frame memory module 104 to the reference frame memory module 105. At this time, data corresponding to numbers earlier than the frame number (or frame number and block number) may be deleted from the frame memory module 104. When information indicating that "there is a decoding error" is received, the no operation is performed. At this time, the frame number (or block number) may be deleted from the reference frame candidate number list, and data corresponding to the number may be deleted from the frame memory module 104.

In the Negative mode, the reference frame adaptive updating module 202 usually copies frame data (or block data) from the frame memory module 104 to the reference frame memory module 105 each time frame data (or block data) is received. The module does this operation in synchronization with the coding module 102. When information indicating that "there is no decoding error" is received from the decoding status determination module 201, the last-received-frame number (or frame number and block number) which is the number of the last frame positively acknowledged is updated. At this time, data earlier than the last-received-frame number may be deleted from the frame memory module 104. When information indicating "there is a decoding error" is received, frame data (or block data) corresponding to the last-received-frame number is copied from the frame memory module 104 to the reference frame memory module 105 in order to change the reference frame to the previous frame with that number.

Upon receiving an intra-frame coding request from the intra/inter determination module 106, the reference frame adaptive updating module 202 copies current frame data from the frame memory module 104 to the reference frame memory module 105 and deletes all frame data from the frame memory module 104.

The transmission status determination module 203 determines the current transmission status based on the decoding status information received from the decoding status determination module 201, and then passes the result to the update method switching module 204. The transmission status is either "good" or "bad." For example, if a transmission error was detected in M frames (or M blocks) out of the last N frames (or N blocks), the status is "bad"; otherwise (N≧M), the status is "good."

In addition, if a transmission error occurs in consecutive L frames (or L blocks), the status is "bad." There may be a plurality of determination criteria at the same time. In that case, the status is "good" if all the determination results are good, and is "bad" if one of determination result is "bad." The status may be determined to be "bad" only if all the results are "bad."

The update method switching module 204 switches the update method to be used by the reference frame adaptive updating module 202, based on the transmission status determined by the transmission status determination module 203. For example, when the determination result is "good," the module switches the mode to the Negative mode; when the determination result is "bad," the module switches the mode to the Active mode.

The following describes the function of the reference frame adaptive updating module 202 with reference to a detailed functional block diagram.

Figure 8:
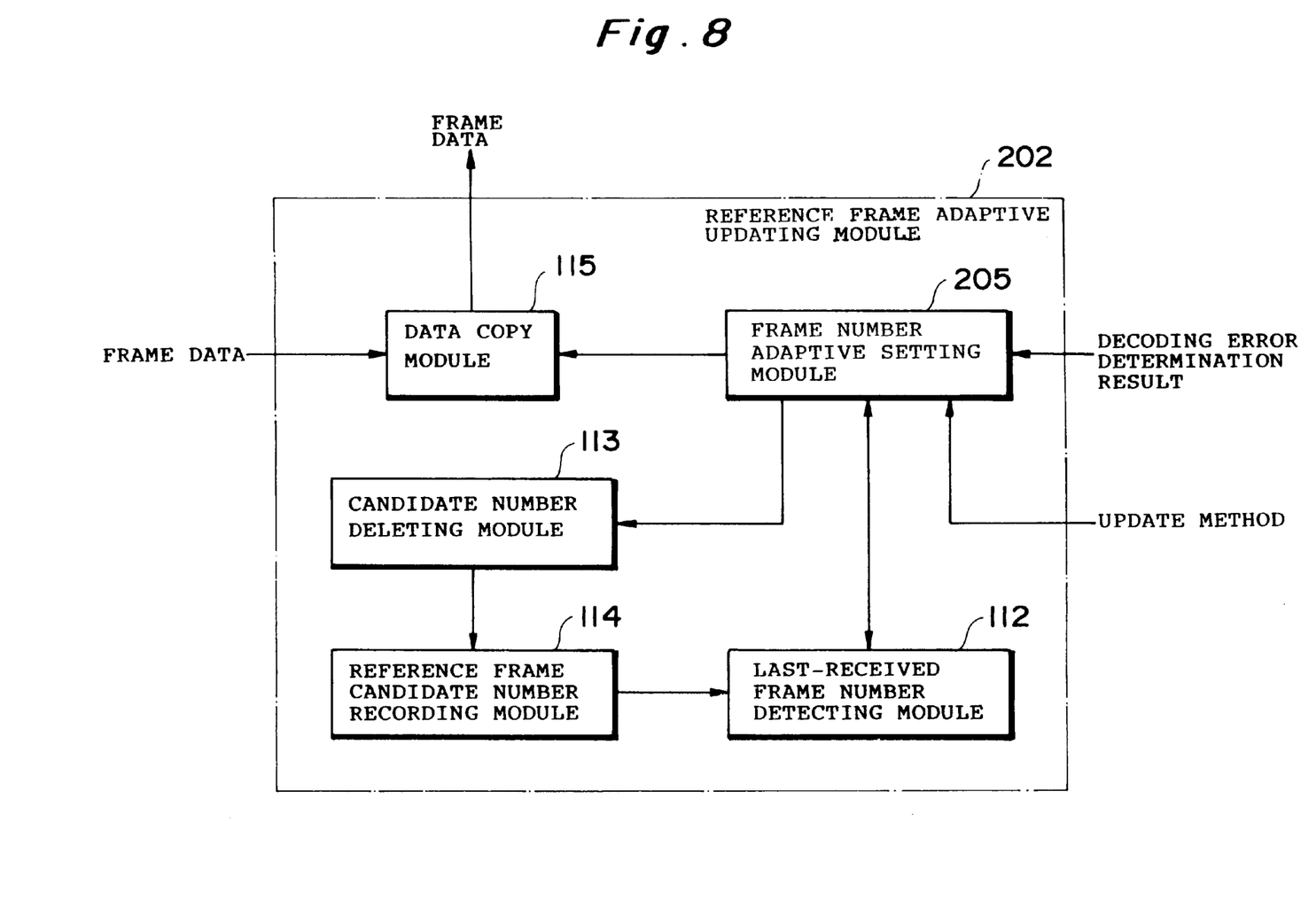
FIG. 8 is a block diagram showing an example of detailed functional configuration of a reference frame updating module used in the second embodiment.

FIG. 8 is an example of detailed functional configuration of the reference frame adaptive updating module 202. Note that, for a module in FIG. 8 with a function equivalent to that of a module shown in the detailed configuration of the reference frame updating module 110 in the first embodiment, the corresponding number is used and no description is given here. The following describes only a frame number adaptive setting module 205 which is a new module.

The operation of the frame number adaptive setting module 205 depends on the update mode that is switched by the update method switching module 204.

For example, in the Active mode, when the frame number adaptive setting module 205 receives information indicating that there is no decoding error from the decoding status determination module 201, it sets up a frame number (or frame number and block number), which is sent with that information, as the number of a frame to be copied and passes the number to the data copy module 115. At the same time, the frame number adaptive setting module 205 passes the frame number (or frame number and block number) of the positively acknowledged frame to the candidate number deleting module 113.

When the frame number adaptive setting module 205 receives from the decoding status determination module 201 a determination result indicating that a decoding error has occurred, it passes the number of incorrect frame (or frame number and block number) to the candidate number deleting module 113.

In the Negative mode, when the frame number adaptive module 205 receives from the decoding status determination module 201 a determination result indicating that a decoding error has occurred, it passes the number of the incorrect frame (or frame number and block number) to the last-received-frame number detecting module 112 and the candidate number deleting module 113. When the frame number adaptive setting module 205 receives a last-received-frame number from the last-received-frame number detecting module 112, it sets up the received last-received-frame number as the number of frame to be copied as the reference picture and then passes the number to the data copy module 115.

When the frame number adaptive setting module 205 receives information indicating that "there is no candidate number" from the last-received-frame number detecting module 112, it determines that no decoding error occurred and suspends processing.

When the frame number adaptive setting module 205 receives from the decoding status determination module 109 a determination result indicating that there is no decoding error, it passes the number of correct frame (or frame number and block number) to the candidate number deleting module 113.

The moving-picture coder (sending device) used in the second embodiment is described below.

In the second embodiment, the sending device checks the transmission status through the use of an acknowledgment signal sent from a receiving device. Inter-frame coding is performed using one of reference frame update modes that is selected according to the transmission status.

Operation of a receiving device does not depends on the mode. That is, the receiving device simply sends an acknowledgment signal (ACK signal) to the sending device. As described in the first embodiment, the receiving device updates a reference frame based on a reference frame number and a block number multiplexed on coded data, and repeats decoding.

The sending device checks the status of the transmission line through the use of the ACK signal and, depending upon the status, switches the update mode.

Normally, the sending device updates the reference frame picture in the Negative mode and, based on the updated reference frame, performs picture coding.

The transmission status determination module 203 continually monitors the transmission status using one or more criteria. Upon detecting that the status is "bad," the mode is switched the mode from the Negative mode to the Active mode that is provided for use when the transmission status is bad. In the example in FIG. 9, the transmission status is determined to be "bad" after two consecutive transmission errors.

Figure 9:
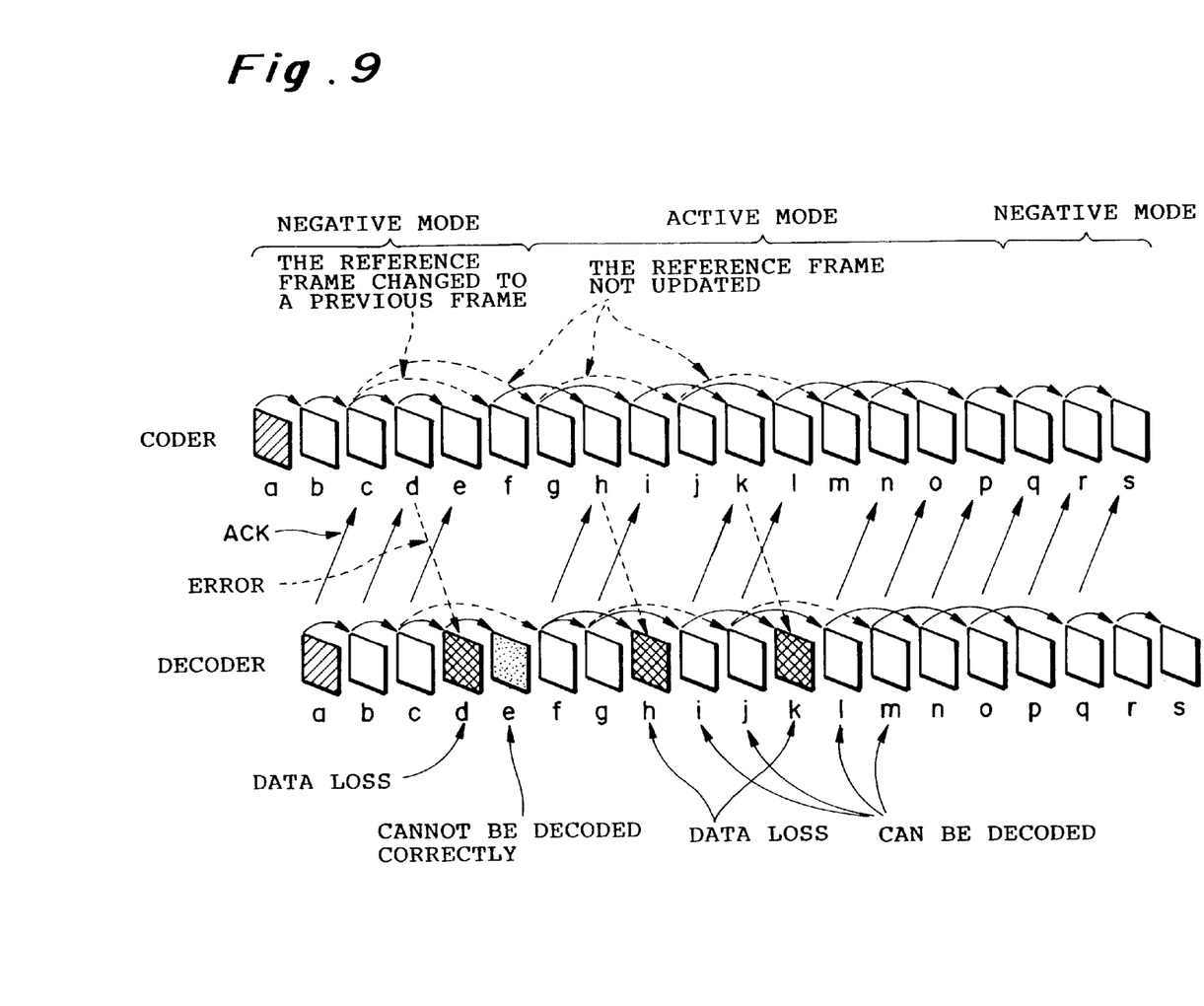
FIG. 9 is a conceptual diagram showing an example of coding when a transmission error occurs in the second embodiment.

That is, when a transmission error occurs on frame d, frame e cannot be decoded because frame d could not be decoded successfully. In this case, the ACK signal cannot be received two consecutive times and therefore the transmission status is determined to be "bad." Then, the mode is changed to the Active mode when the next frame, g, is coded while the reference picture, which is not yet updated, is still frame c.

As described above, when the reference frame update mode is changed to the Active mode, the reference frame is updated when the ACK signal is received. When the ACK signal is not received, the reference frame is not updated.

When the transmission status determination module 203 determines in the Active mode that the transmission status is "good", the mode returns to the Negative mode. In FIG. 9, the transmission status is determined to be "good" when four consecutive correct frames are received.

That is, when the ACK signal is received for four consecutive frames (l, m, n, and o), the transmission status is determined to be "good." At this point, the mode changes to the Negative mode and coding is performed while referencing the immediately-preceding frame p.

Thus, while there is no decoding error, the reference frame picture is updated in the Negative mode each time a frame is received. This does not degrade coding efficiency even when the transmission delay is large. Another problem with the Negative mode is that a frame immediately following an incorrect frame cannot be decoded. However, as long as a decoding error occur less frequently, degradation of picture quality is not so large; in fact, because the picture quality during a non-error period is dominant in the Negative mode, picture quality degradation is not large.

On the other hand, in the Active mode which is used when a decoding error occurs frequently, all frames are decoded with no large degradation in picture quality. In particular, when a decoding error occurs repeatedly, coding in the Active mode gives a result 1–1.5 dB better than the result of the conventional coding method or the Negative mode.

In the second embodiment, the coder codes moving-picture data by referencing a successfully-received frame without waiting for the next I frame, as in the first embodiment, ensuring good coding efficiency. In addition, the ability to adaptively switching the reference frame update mode according to the transmission status gives optimal coding efficiency.

While there is no transmission error, the reference frame picture is updated each time a frame is received. Therefore, coding efficiency is not decreased even when the round trip delay is large. When a transmission error occurs less frequently, the Negative mode is used to prevent picture quality from being degraded. When a transmission error occurs frequently, the Active mode, which stables picture quality with no sudden degradation, is used to maintain picture quality.

In either update mode, only the ACK signal is used for the decoding status signal. This decreases the complexity involved in mode switching. In addition, the ability to send a correct frame number or a correct block number eliminates the need to wait for correct data after an error, minimizing delays. Because the sending device uses the decoding status signal to check the transmission status in order to determine whether the update module must be changed, no additional information is needed to check the transmission status.

Operation of the receiving device does not depend on the update mode of the reference frame. Mode switching is performed only on the sending device, and information on mode switching need not be sent to the receiving device. This does not require the re-configuration of the receiving device but prevents additional transmission load. It should be noted that mode switching is performed as a result of a change in the transmission line status and that information exchange between the sending device and the receiving device requires error correction processing. It includes error correction codes, error protection, or retransmission. Thus, elimination of the need to send switching information results in an increase in system operation efficiency.

Variations of the second embodiment are:

(1) Although, in the second embodiment, the transmission status is one of two stages, either "good" or "bad," and therefore there are two update modes. There may be three or more transmission status modes. For example, a new stage "extremely bad" may be added. If there is an error in almost all consecutive pieces of data, coding may be done at a lower level to reduce the amount of coding and to reduce the probability of errors.

(2) Although only the sending device performs mode switching and no mode-switching information is sent to the receiving device in the second embodiment, the present invention is not limited to this configuration. Mode-switching information may be sent to the receiving device to allow it, for example, to clear the frame memory module. For example, in the Active mode, data that is earlier than the frame (or block) selected for the reference frame may be deleted.

(3) In the second embodiment, mode switching may be done by the receiving device. The acknowledgment signal is used to detect an error ratio only on a frame basis or on a block basis, while the receiving device may detect an error ratio on the transmission line, more flexibly, on a bit basis with the use of the CRC. The receiving device may specify a mode based on a detected error ratio, or may send a detected error ratio to the sending device to allow it to perform mode switching based on the received error ratio.

(4) In the second embodiment, the transmission status is determined to be bad if an error is detected in L or more consecutive frames or in L or more consecutive blocks. It is also possible to determine that the transmission status is bad when a decoding error occurs consecutively in the same block of a plurality of frames continuously.

(5) In the second embodiment, the transmission status is determined by the number of decoding errors detected through the decoding status signal, and the mode is switched automatically according to the determined status. The transmission status may also be determined manually. For example, a user on the sending device may switch the update mode or may send a switching signal to allow a user on the receiving device to switch the mode.

(C) Other Embodiments (1) The moving-picture coder in each of the above embodiments may be implemented as a hardware unit or a software program.

(2) In each of the above embodiments, transmission data is moving-picture data. Transmission data may be voice data or binary data.

As described above, according to the present invention, the picture decoder sends the decoding status signal and a frame number (or frame number and block number) to the picture coder. The picture coder controls the update of a reference picture based on the decoding status signal and the frame number (or frame number and block number). If a transmission line over which coded data is transmitted is low in error frequency and high in transmission quality, high picture quality is ensured. Conversely, if the line is high in error frequency and low in transmission quality, P frames may be decoded before the next I frame arrives.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A picture coder which includes coding means for coding input pictures through predictive coding, one at a time, based on a reference picture and for outputting coded data; transmission means for transmitting the coded data coded by the coding means and a frame number thereof to a picture decoder; and reference picture updating means for controlling updating of the reference picture based on a decoding status signal sent from the picture decoder and an associated frame number, said picture coder comprising:

decoding status determination means which uses an acknowledgment signal as the decoding status signal and which determines that a decoding error has occurred if the acknowledge signal is not received within a specified time, wherein, as a next reference picture, the reference picture updating means selects one of pictures transmitted correctly before the decoding error occurred.

2. A picture coder as set forth in claim 1, wherein the reference picture updating means divides each frame of the input picture into a plurality of blocks and updates the reference picture using the frame number of the frame and a block number of each of subdivided blocks.

3. A picture coder as set forth in claim 1, wherein the reference picture updating means records a number of the frame for which the acknowledgment signal is received as a last-received number and, upon detecting the decoding error, sets up the frame or the block with the last-received number as the reference picture.

4. A picture coder as set forth in claim 2, wherein the reference picture updating means records a number of the frame for which the acknowledgment signal is received as a last-received number and, upon detecting the decoding error, sets up the frame or the block with the last-received number as the reference picture.

5. A picture coder as set forth in claim 1, wherein the reference picture updating means comprises:

a frame number storage module for storing the frame number of the input picture, coded by the coding means, as a candidate of the reference picture; and a deleting module for deleting the frame number on which the decoding error occurred and frame numbers of input pictures coded after the decoding error, wherein, the picture with the frame number stored in the frame number storage module is selected as the reference frame.

6. A picture coder as set forth in claim 2, wherein the reference picture updating means comprises:

a frame number storage module for storing the frame number of the input picture, coded by the coding means, as a candidate of the reference picture; and a deleting module for deleting the frame number on which the decoding error occurred and frame numbers of input pictures coded after the decoding error, wherein, the picture with the frame number stored in the frame number storage module is selected as the reference frame.

7. A picture coder as set forth in claim 3, wherein the reference picture updating means comprises:

a frame number storage module for storing the frame number of the input picture, coded by the coding means, as a candidate of the reference picture; and a deleting module for deleting the frame number on which the decoding error occurred and frame numbers of input pictures coded after the decoding error, wherein, the picture with the frame number stored in the frame number storage module is selected as the reference frame.

8. A picture coder as set forth in claim 4, wherein the reference picture updating means comprises:

a frame number storage module for storing the frame number of the input picture, coded by the coding means, as a candidate of the reference picture; and a deleting module for deleting the frame number on which the decoding error occurred and frame numbers of input pictures coded after the decoding error, wherein, the picture with the frame number stored in the frame number storage module is selected as the reference frame.

9. A picture coder as set forth in claim 1, further comprising:

status determination means for determining a transmission line status based on the decoding status signal and the frame number; and update mode switching means for switching and controlling, in response to a determination result of the transmission line status determination means, an update method of the reference image updated by the reference picture updating means.

10. A picture coder as set forth in claim 2, further comprising:

status determination means for determining a transmission line status based on the decoding status signal and the frame number; and update mode switching means for switching and controlling, in response to a determination result of the transmission line status determination means, an update method of the reference image updated by the reference picture updating means.

11. A picture coder as set forth in claim 9, wherein, when the transmission line status determination means determines that the transmission line status is good, the update method switching means switches the update method from the update method by which the reference picture is updated when there is no decoding error to the update method by which the reference picture is changed to one of previous pictures when there is the decoding error.

12. A picture coder as set forth in claim 10, wherein, when the transmission line status determination means determines that the transmission line status is good, the update method switching means switches the update method from the update method by which the reference picture is updated when there is no decoding error to the update method by which the reference picture is changed to one of previous pictures when there is the decoding error.

13. A picture coder as set forth in claim 9, wherein, when the transmission line status determination means determines that the transmission line status is bad, the update method switching means switches the update method from the update method by which the reference picture is changed to one of previous pictures when there is the decoding error to the update method by which the reference picture is updated when there is no decoding error.

14. A picture coder as set forth in claim 10, wherein, when the transmission line status determination means determines that the transmission line status is bad, the update method switching means switches the update method from the update method by which the reference picture is changed to one of previous pictures when there is the decoding error to the update method by which the reference picture is updated when there is no decoding error.

* * * * *